United States Patent
Kiyomori et al.

(10) Patent No.: US 11,118,072 B2
(45) Date of Patent: Sep. 14, 2021

(54) WATER REPELLENT FILM-FORMING COMPOSITION AND WATER REPELLENT FILM

(71) Applicant: Shin-Etsu Chemical Co., Ltd., Tokyo (JP)

(72) Inventors: Ayumu Kiyomori, Joetsu (JP); Shotaro Aoki, Joetsu (JP); Masato Kawakami, Joetsu (JP); Tohru Kubota, Tokyo (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 100 days.

(21) Appl. No.: 16/380,700

(22) Filed: Apr. 10, 2019

(65) Prior Publication Data
US 2019/0315972 A1 Oct. 17, 2019

(30) Foreign Application Priority Data

Apr. 11, 2018 (JP) .............................. JP2018-075839
Dec. 28, 2018 (JP) .............................. JP2018-246867

(51) Int. Cl.
| | | |
|---|---|---|
| *C09D 5/16* | (2006.01) | |
| *C09D 7/61* | (2018.01) | |
| *C09D 183/16* | (2006.01) | |
| *C08G 77/62* | (2006.01) | |
| *C08K 3/36* | (2006.01) | |

(52) U.S. Cl.
CPC .............. *C09D 5/1662* (2013.01); *C09D 7/61* (2018.01); *C09D 183/16* (2013.01); *C08G 77/62* (2013.01); *C08K 3/36* (2013.01)

(58) Field of Classification Search
None
See application file for complete search history.

(56) References Cited

U.S. PATENT DOCUMENTS

| 7,022,416 B2 | 4/2006 | Teranishi | |
|---|---|---|---|
| 9,856,407 B2 | 1/2018 | Hakoshima et al. | |
| 10,385,234 B2 * | 8/2019 | Grottenmuller | C09D 183/16 |
| 2003/0083453 A1 * | 5/2003 | Lukacs, III | C08G 77/54 528/10 |
| 2009/0286086 A1 * | 11/2009 | Dierdorf | C09D 183/16 428/412 |

FOREIGN PATENT DOCUMENTS

| CN | 106189832 A | 12/2016 |
|---|---|---|
| JP | 11-172455 A | 6/1999 |
| JP | 2004-137137 A | 5/2004 |
| JP | 2005-343016 A | 12/2005 |
| JP | 2014-124913 A | 7/2014 |
| WO | WO 03/039856 A1 | 5/2003 |

OTHER PUBLICATIONS

Extended European Search Report dated Jul. 19, 2019, in European Patent Applciation No. 19166684.1.

* cited by examiner

*Primary Examiner* — Robert T Butcher
(74) *Attorney, Agent, or Firm* — Birch, Stewart, Kolasch & Birch, LLP

(57) ABSTRACT

A composition is provided comprising (a) a polysilazane having a monovalent hydrocarbon group, (b) untreated metal oxide nanoparticles, metal oxide nanoparticles having a monovalent hydrocarbon group, or metal oxide nanoparticles having an alkylsilyl or alkoxysilyl group, and (c) an aprotic solvent. The composition has storage stability and is suitable for forming a film having water repellent, especially superhydrophobic properties.

4 Claims, No Drawings

WATER REPELLENT FILM-FORMING COMPOSITION AND WATER REPELLENT FILM

CROSS-REFERENCE TO RELATED APPLICATION

This non-provisional application claims priority under 35 U.S.C. § 119(a) on Patent Application Nos. 2018-075839 and 2018-246867 filed in Japan on Apr. 11, 2018 and Dec. 28, 2018, respectively, the entire contents of which are hereby incorporated by reference.

TECHNICAL FIELD

This invention relates to a composition for forming a water repellent film on a substrate and a water repellent film.

BACKGROUND ART

As a daily occurrence, rain and tap water come in contact with building walls, window panes, automobile bodies, bathroom mirrors and the like, and water droplets stay on their surface. Since various inorganic salts and microorganisms are dissolved in rain and tap water, water spots and mold stains are left after dry-out of droplets, adversely affecting the esthetic appearance. Also, water droplets deposited on the glass or mirror surface have an impact on the transmittance and reflectivity of light, with a lowering of visibility.

An attempt to form a water repellent film on the surface of solid materials such as metals, ceramics, glass and resins is effective for preventing deposition of water droplets. Such members endowed with water repellency on their surface are used in a variety of applications including building and vehicle glass panes, automobile and train bodies, solar panel glass covers, bathroom mirrors and kitchen panels. This improves esthetic appearance and saves or eliminates maintenance trouble.

A solid surface is regarded water repellent when the contact angle with water exceeds 90°. The aforementioned problem is not solved by a solid material exhibiting water repellency if water droplets remain attached thereon. It is thus crucial to improve not only water repellency, but also sliding properties of water droplets.

A solid surface is regarded "superhydrophobic" when the contact angle with water exceeds 150°. This surface is superior in both repelling and sliding of water droplets as found on plant leaves like lotus and taro, and gives an antifouling surface. Several proposals are made to form a superhydrophobic film by combining microscopic irregularities with a reduction of surface free energy so as to simulate these plant leaves.

For example, Patent Document 1 discloses a method for surface-modifying a substrate by coating the substrate surface with a treating solution containing a polycondensate of metal alkoxide, metal oxide microparticles, and a silane compound having a fluoroalkyl or alkyl group, drying and heating the coating. Specifically, the method forms a porous metal oxide layer on the substrate surface, which has at a surface a microscopic irregular structure that agglomerates of metal oxide microparticles are fixedly secured to the metal oxide matrix and the fluoroalkyl or alkyl group exhibiting water repellency is exposed and which has a multiplicity of pores open at the surface.

Patent Document 2 discloses an article coated with a superhydrophobic film on a substrate surface. The superhydrophobic film contains protrusions formed of agglomerates of microparticles, protrusion-bearing regions and protrusion-free regions are mixedly distributed, and the surface of the film in the protrusion-bearing regions includes convex and concave portions formed by the protrusions. Specifically, a cohydrolytic polycondensate of water repellent material and silicon oxide microparticles is prepared by mixing 3D bonded colloidal silica, an alkylalkoxysilane and a fluorinated alkylalkoxysilane, and adding a water-containing acid catalyst thereto. The resulting polycondensate dispersion for water repellent treatment is coated on a glass plate by flow coating technique and air dried, obtaining a superhydrophobic treated glass plate.

Patent Document 3 discloses a superhydrophobic article comprising a substrate, an undercoat having microscopic irregularities on the surface of the substrate, and a water repellent film formed on microscopic irregularities of the undercoat. The surface morphology of the water repellent film is composed of granular protrusions and columnar protrusions which are higher than the granular protrusions in height as measured from the substrate surface. Specifically, a decamethylcyclopentasiloxane solution of tetrachlorosilane is prepared as an irregular undercoat-forming coating solution composed mainly of silica. Separately, a decamethylcyclopentasiloxane solution of heptadecafluorodecyltrichlorosilane is prepared as a water repellent agent. The irregular undercoat-forming coating solution is coated on a surface of automobile windshield glass by flow coating technique, and the water repellent agent is further coated. The coated glass is allowed to stand, washed with ethanol to completely wash away the water repellent agent on the surface, and then air dried. There is obtained water repellent treated windshield glass.

Patent Document 4 relates to an article coated with a silicon oxide based film having microscopic irregularities on its surface, the microscopic irregularities composed of microscopic protrusions and columnar protrusions. The coated article is prepared by coating an article with a coating solution of tetrachlorosilane in a silicone oil based solvent to form a coating having microscopic irregularities. In one application, a decamethylcyclopentasiloxane solution of heptadecafluorooctyltrichlorosilane is coated onto the coating having microscopic irregularities by flow coating technique. The coating is allowed to stand, washed with ethanol to remove the excessive silane solution, and air dried. There is obtained water repellent treated glass.

Patent Document 5 describes a water repellent transparent coating-substrate assembly comprising a substrate and a water repellent transparent coating on the substrate surface. The water repellent transparent coating is composed of an inorganic oxide microparticle layer containing inorganic oxide microparticles and an overcoat layer thereon. The water repellent transparent coating has an irregular structure surface composed of depressions and protrusions, the average height of protrusions, the average interval (or pitch width) of protrusions, and a ratio of average height to average interval are controlled to specific ranges. The surface of protrusions of the irregular structure has finer irregularities.

In Patent Document 5, the assembly is prepared, for example, by (A) adding tetraethoxysilane and water to a methanol dispersion of alumina microparticles having a specific average particle length and average particle breadth, reacting them to perform surface treatment of alumina microparticles, diluting the dispersion with a solvent, thus forming a dispersion of surface-treated alumina microparticles, coating the dispersion to a substrate, and curing to form an inorganic oxide microparticle layer, (B) reacting tridecafluorooctyltrimethoxysilane with water in an alcohol in the presence of an acid catalyst to effect hydrolysis, diluting the solution with a solvent to form an overcoat layer-forming coating solution having an adjusted concentration, coating the overcoat layer-forming coating solution to the inorganic oxide microparticle layer, heat curing the coating, yielding a water repellent transparent coating-substrate assembly. Preferably, a primer layer is formed on the substrate prior to step (A), and a binder layer is formed on the inorganic oxide microparticle layer between steps (A) and (B).

CITATION LIST

Patent Document 1: JP-A H11-172455
Patent Document 2: JP-A 2005-343016
Patent Document 3: WO 2003/039856
Patent Document 4: JP-A 2004-137137
Patent Document 5: JP-A 2014-124913 (U.S. Pat. No. 9,856,407)

DISCLOSURE OF INVENTION

The method of Patent Document 1 uses a silane compound having a low molecular weight to form a water repellent film. In the case of a low reactivity compound like alkoxysilane, there is a risk that the silane compound volatilizes off from the water repellent film-forming coating solution or the water repellent film.

Patent Documents 2 and 5 use alkoxysilanes as the water repellent film-forming material. Since the alkoxysilanes as such are low reactive, water and a hydrolytic catalyst such as nitric acid or hydrochloric acid are added thereto. Since the hydrolytic catalyst also serves as a condensation catalyst, simultaneous hydrolysis and condensation of alkoxysilanes take place in the coating solution. Therefore, the coating solution is not necessarily stable, with the risk of insoluble solids precipitating out during shelf storage.

Also, in Patent Documents 3 and 4, the step of forming the water repellent film uses a chlorosilane having a very high reactivity with water and the substrate. Thus the coating solution is less stable during storage.

An object of the invention is to provide a water repellent film-forming composition which has chemical stability and good storage stability, and can be repeatedly used and form a water repellent, especially superhydrophobic film in a simple reproducible manner.

The inventors have found that the outstanding problems are solved by using a polysilazane of specific structure.

In one aspect, the invention provides a water repellent film-forming composition comprising:

(a) a polysilazane having an optionally fluorinated $C_3$-$C_{20}$ monovalent hydrocarbon group bonded to a silicon atom, (b) untreated metal oxide nanoparticles, metal oxide nanoparticles having an optionally fluorinated $C_1$-$C_{20}$ monovalent hydrocarbon group on their surface, or metal oxide nanoparticles having an alkylsilyl or alkoxysilyl group on their surface, and (c) an aprotic solvent.

Preferably, component (a) is a polysilazane having the general formula (1):

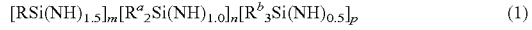

wherein R is each independently an optionally fluorinated $C_3$-$C_{20}$ monovalent hydrocarbon group, $R^a$ and $R^b$ are each independently an optionally fluorinated $C_1$-$C_{20}$ monovalent hydrocarbon group, m is an integer of 1 to 100, n and p are each independently an integer of 0 to 100, and the sum of m, n and p is an integer of 4 to 300.

More preferably, the metal oxide nanoparticles (b) have been surface treated with the polysilazane having formula (1) so that the nanoparticles have an optionally fluorinated $C_3$-$C_{20}$ monovalent hydrocarbon group via a silicon atom on their surface.

Typically, the metal oxide nanoparticles (b) are of silica.

In another aspect, the invention provides a water repellent film comprising (a) a polysilazane having an optionally fluorinated $C_3$-$C_{20}$ monovalent hydrocarbon group bonded to a silicon atom, and (b) untreated metal oxide nanoparticles, metal oxide nanoparticles having an optionally fluorinated $C_1$-$C_{20}$ monovalent hydrocarbon group on their surface, or metal oxide nanoparticles having an alkylsilyl or alkoxysilyl group on their surface.

Advantageous Effects of Invention

The water repellent film-forming composition of the invention has good storage stability, and can be repeatedly used and form a water repellent, especially superhydrophobic film in a simple reproducible manner. Using the composition, a film having excellent water repellency, droplet sliding properties and durability is obtainable.

DESCRIPTION OF PREFERRED EMBODIMENTS

As used herein, the notation (Cn-Cm) means a group containing from n to m carbon atoms per group. "Optional" or "optionally" means that the subsequently described event or circumstances may or may not occur, and that description includes instances where the event or circumstance occurs and instances where it does not.

One embodiment of the invention is a water repellent film-forming composition comprising:

(a) a polysilazane having an optionally fluorinated $C_3$-$C_{20}$ monovalent hydrocarbon group bonded to a silicon atom, (b) untreated metal oxide nanoparticles, metal oxide nanoparticles having an optionally fluorinated $C_1$-$C_{20}$ monovalent hydrocarbon group on their surface, or metal oxide nanoparticles having an alkylsilyl or alkoxysilyl group on their surface, and (c) an aprotic solvent.

(a) Polysilazane

Polysilazanes are polymers in which silicon and nitrogen atoms alternate to form the backbone. For example, commercially available perhydropolysilazane is a polysilazane in which all substituents bonded to silicon atoms are hydrogen atoms, but not organic substituents, and a film formed thereof is hydrophilic. In contrast, the polysilazane used herein forms a film which has low surface free energy and thus exhibits water repellency because it has a $C_3$-$C_{20}$ monovalent hydrocarbon group bonded to a silicon atom. When the monovalent hydrocarbon group is substituted with fluorine, the surface free energy of the film is further reduced.

Preferably, component (a) is a polysilazane having the general formula (1).

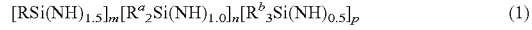

Herein R is each independently an optionally fluorinated $C_3$-$C_{20}$ monovalent hydrocarbon group. $R^a$ and $R^b$ are each independently an optionally fluorinated $C_1$-$C_{20}$ monovalent hydrocarbon group. The subscript m is an integer of 1 to 100, n and p are each independently an integer of 0 to 100, and the sum of m, n and p is an integer of 4 to 300.

In formula (1), R which may be the same or different is a monovalent hydrocarbon group of 3 to 20 carbon atoms, preferably 3 to 16 carbon atoms, more preferably 6 to 16 carbon atoms, which may be substituted with fluorine. Examples of substituent R include straight aliphatic saturated hydrocarbon groups such as propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl; branched aliphatic saturated hydrocarbon groups such as isopropyl, isobutyl, 2-butyl, tert-butyl, isopentyl, 2-pentyl, 3-pentyl, tert-pentyl, isohexyl, 2-ethylhexyl, and isooctyl; aliphatic unsaturated hydrocarbon groups such as allyl, butenyl, methallyl, pentenyl, hexenyl, octenyl and decenyl; aromatic hydrocarbon groups such as phenyl, tolyl, xylyl and mesityl; aralkyl groups such as benzyl, phenylethyl, phenylpropyl, and phenylbutyl; fluorinated aliphatic hydrocarbon groups such as 3,3,3-trifluoropropyl, nonafluorohexyl, tridecafluorooctyl, and heptadecafluorodecyl; fluorinated aromatic hydrocarbon groups such as pentafluorophenyl, 3,5-difluorophenyl, 3-fluorophenyl, 4-fluorophenyl, 3-trifluoromethylphenyl, 3,5-bis(trifluoromethyl)phenyl; and fluorinated aralkyl groups such as pentafluorophenylethyl, pentafluorophenylpropyl, pentafluorophenylbutyl, 3,4,5-trifluorophenylpropyl, 2,4-difluorophenylpropyl, 3,4-difluorophenylpropyl, 3,5-difluorophenylpropyl, 2-fluorophenylethyl, 2-fluorophenylpropyl, 3-fluorophenylethyl, 3-fluorophenylpropyl, 4-fluorophenylethyl, 4-fluorophenylpropyl, 4-(trifluoromethyl)phenylpropyl, 3,5-bis(trifluoromethyl)phenylpropyl. Of these, straight or branched aliphatic saturated monovalent hydrocarbon groups, aliphatic unsaturated monovalent hydrocarbon groups, and fluorinated aliphatic saturated monovalent hydrocarbon groups are preferred from the standpoint of reducing the surface free energy of a film.

In formula (1), $R^a$ and $R^b$ which may be the same or different are selected from monovalent hydrocarbon groups of 1 to 20 carbon atoms, preferably 1 to 10 carbon atoms, more preferably 1 to 5 carbon atoms, which may be substituted with fluorine. Examples of substituents $R^a$ and $R^b$ include alkyl groups such as methyl and ethyl and aliphatic unsaturated monovalent hydrocarbon groups such as vinyl as well as the groups exemplified above for R. Although the inclusion of a substituent group of lower carbon count leads to increased surface free energy of a film, the solubility and viscosity of polysilazane can be adjusted to a proper range by introducing such a lower substituent group.

The polysilazane having formula (1) need not necessarily contain repeating units having substituents $R^a$ and $R^b$. However, by introducing these repeating units, the polysilazane can be adjusted to a proper range of physical properties such as molecular weight, solubility and viscosity.

In formula (1), m is an integer of 1 to 100, preferably 4 to 50; n and p are each independently an integer of 0 to 100, preferably 0 to 50; and the sum of m, n and p is an integer of 4 to 300, preferably 4 to 100, more preferably 4 to 50. The polysilazane having formula (1) necessarily contains a repeating unit having substituent R, which ensures that a film having reduced surface free energy is formed from a composition comprising the same.

Although the relationship of m, n and p is not particularly limited, the ratio m/(m+n+p) is preferably from 0.01 to 1, more preferably from 0.1 to 1, even more preferably from 0.25 to 1. If this ratio is less than 0.01, there is a possibility that the influence of substituent R on the surface free energy of a film is reduced, failing to form a water repellent film, and a polysilazane has a lower molecular weight, becomes volatile and forms a film having unstable properties.

The polysilazane should preferably have a weight average molecular weight (Mw) of 300 to 30,000, more preferably 500 to 10,000, as measured by gel permeation chromatography (GPC) versus polystyrene standards. The GPC measurement conditions are described later.

In the composition, the amount of component (a) is preferably 0.001 to 50% by weight, more preferably 0.01 to 30% by weight, even more preferably 0.01 to 10% by weight of the overall composition. If the amount of component (a) is less than 0.001% by weight, a film may be too thin to exert water repellency. If the amount of component (a) exceeds 50% by weight, a composition may become too viscous. In the embodiment wherein the composition is prepared while surface treating component (b) with component (a) as will be described later, the theoretical amount of component (a) added is calculated based on the specific surface area and amount of component (b), and even in this embodiment, preferably falls in the above range.

(b) Metal Oxide Nanoparticles

The metal oxide nanoparticles used herein as component (b) are typically nanoparticles of at least one metal oxide selected from the group consisting of silica, alumina, titania, zirconia, zinc oxide, tin oxide, cerium oxide, copper oxide, chromium oxide, cobalt oxide, iron oxide, manganese oxide, and nickel oxide. Inter alia, nanoparticles of silica, alumina, titania, zirconia, zinc oxide, tin oxide, and cerium oxide are preferred, with nanoparticles of silica, alumina, titania, and zirconia being more preferred. Most preferred is fumed silica, that is, nanoparticles consisting essentially of silica.

The metal oxide nanoparticles preferably have an average primary particle size or diameter of 5 to 200 nm, more preferably 10 to 150 nm, even more preferably 10 to 50 nm. If the particle size is less than 5 nm, no effective protrusions and recesses may be available on a film. If the particle size exceeds 200 nm, a film may become less transparent. It is noted that the average primary particle size is measured under a scanning electron microscope (SEM).

In the case of fumed silica, the average primary particle size is correlated to the specific surface area thereof as measured by the BET method. For example, the average primary particle size is about 30 nm when the specific surface area is 50 $m^2/g$, the average primary particle size is about 12 nm when the specific surface area is 200 $m^2/g$, and the average primary particle size is about 7 nm when the specific surface area is 300 $m^2/g$. When fumed silica is used, its specific surface area is preferably in a range of 30 to 500 $m^2/g$, more preferably 50 to 350 $m^2/g$.

Besides untreated metal oxide nanoparticles, component (b) may be metal oxide nanoparticles which have been hydrophobic treated so that they have an optionally fluorinated $C_1$-$C_{20}$ monovalent hydrocarbon group on their surface. The metal oxide nanoparticles which have been hydrophobic treated include metal oxide nanoparticles having introduced in their surface an alkyl group of 1 to 20 carbon atoms, preferably 1 to 10 carbon atoms such as methyl, ethyl, propyl, butyl, pentyl, hexyl, heptyl, octyl, nonyl, decyl, dodecyl, tetradecyl, hexadecyl, octadecyl, and eicosyl, or a substituent group as exemplified for $R^a$ and $R^b$ in formula (1), like those commercially available under the trade name of Aerosil R805, Aeroxide T805, Aeroxide NKT90 and Aeroxide AluC805 (Nippon Aerosil Co., Ltd.); and metal oxide nanoparticles which have been surface treated with a dialkyl silyl group such as dimethylsilyl, or a trialkylsilyl group of 1 to 6 carbon atoms, preferably 1 to 3 carbon atoms such as trimethylsilyl, triethylsilyl, tertbutyldimethylsilyl, triisobutylsilyl, or triisopropylsilyl, like those commercially available under the trade name of Aerosil R972, Aerosil R974, Aerosil R976, Aerosil RX50, Aerosil RX200, Aerosil RX300 and Aerosil R812 (Nippon Aerosil Co., Ltd.), and HDKH15, HDKH20 and HDKH30 (Wacker Asahi Kasei Silicone Co., Ltd.).

Also, metal oxide nanoparticles having an alkoxysilyl group on their surface may be used as component (b). When metal oxide nanoparticles have an alkoxysilyl group on their surface, the alkoxysilyl group on the surface of metal oxide nanoparticles forms a covalent bond with the polysilazane as component (a) through hydrolytic condensation reaction so that a film becomes more durable.

Suitable alkoxysilyl groups are those in which the alkyl moiety in the alkoxy group has 1 to 6 carbon atoms, preferably 1 to 3 carbon atoms. Examples include trialkoxysilyl groups such as trimethoxysilyl, triethoxysilyl, tripropoxysilyl, triisopropoxysilyl, diisopropoxymethoxysilyl, and dimethoxyisopropoxysilyl, dialkoxysilyl groups such as dimethoxymethylsilyl and diethoxymethylsilyl, and monoalkoxysilyl groups such as methoxydimethylsilyl, ethoxydimethylsilyl, isopropoxydimethylsilyl, methoxydiethylsilyl, methoxydipropylsilyl, and methoxydiisopropylsilyl.

Various methods may be used in introducing an alkoxysilyl group to the surface of metal oxide nanoparticles. One preferred method is by reacting hydroxyl groups on the surface of untreated metal oxide nanoparticles with an alkoxysilylating agent. Suitable alkoxysilylating agents include alkoxysilanes such as tetramethoxysilane, tetraethoxysilane, methyltrimethoxysilane, methyltriethoxysilane; alkoxysilane oligomers such as tetramethoxysilane oligomer, tetraethoxysilane oligomer, methyltrimethoxysilane oligomer; alkoxyhalosilanes such as chlorotrimethoxysilane, chlorotriethoxysilane, chlorodimethoxymethylsilane, chlorodiethoxymethylsilane; alkoxysilazanes such as trimethoxysilyldimethylamine and trimethoxysilyldiethylamine; alkoxysilylketene acetals such as 1-trimethoxysilyloxy-1-methoxypropene, 1-trimethoxysilyloxy-1-ethoxypropene, 1-trimethoxysilyloxy-1-butoxypropene, 1-trimethoxysilyloxy-1-methoxy-2-methylpropene, 1-triethoxysilyloxy-1-ethoxypropene, 1-dimethoxymethylsilyloxy-1-methoxypropene, 1-dimethoxymethylsilyloxy-1-ethoxypropene, 1-dimethoxymethylsilyloxy-1-octyloxypropene, 1-diethoxymethylsilyloxy-1-methoxypropene, 1-diethoxymethylsilyloxy-1-ethoxypropene, 1-methoxydimethylsilyloxy-1-methoxypropene, and 1-methoxydimethylsilyloxy-1-ethoxypropene. Inter alia, the alkoxysilylketene acetals are preferred because they are neutral alkoxysilylating agents and removal of by-products is easy.

It is preferred from the standpoint of dispersing metal oxide nanoparticles that the amount of alkoxysilyl groups introduced is preferably 0.1 to 1, more preferably 0.3 to 1, even more preferably 0.5 to 1, provided that the saturation introduction amount relative to metal oxide nanoparticles used as component (b) is unity (1). The saturation introduction amount of alkoxysilyl groups is determined, for example, by mixing untreated metal oxide nanoparticles with the alkoxysilylating agent in a certain ratio, and measuring the consumed amount (or residual amount) of the alkoxysilylating agent by gas chromatography. The term "saturation introduction amount" refers to the amount of alkoxysilyl groups introduced until the alkoxysilylating agent is no longer consumed through kept in contact with the metal oxide nanoparticles.

When surfaces of metal oxide nanoparticles are alkoxysilylated using the alkoxysilylating agent, the metal oxide nanoparticles may be brought into contact with the alkoxysilylating agent in the presence or absence of a solvent. The solvent used herein is not particularly limited as long as it is aprotic and inert to the alkoxysilylating agent. Examples include hydrocarbon solvents such as hexane, heptane, octane, isooctane, nonane, decane, toluene, xylene and mesitylene; hydrocarbon solvent mixtures such as isoparaffin base solvents and naphthene base solvents; ketones such as acetone, methyl ethyl ketone, methyl isobutyl ketone; nitriles such as acetonitrile, propionitrile, benzonitrile; amides such as dimethylformamide, dimethylacetamide, N-methylpyrrolidone; ether solvents such as diethyl ether, dipropyl ether, diisopropyl ether, tetrahydrofuran, cyclopentyl methyl ether, dibutyl ether, ethylene glycol dimethyl ether, propylene glycol dimethyl ether, diethylene glycol dimethyl ether, dipropylene glycol dimethyl ether; and ester solvents such as ethyl acetate, propyl acetate, isopropyl acetate, butyl acetate, methoxyethyl acetate, and hexyl acetate, which may be used alone or in admixture. When a liquid alkoxysilylating agent is used in excess, alkoxysilylating reaction may be conducted in a solventless system.

It is noted that silanol groups remain on the untreated metal oxide nanoparticles or the metal oxide nanoparticles having a monovalent hydrocarbon, alkylsilyl or alkoxysilyl group. The surface treatment of such silanol groups on metal oxide nanoparticles with the polysilazane as component (a) results in metal oxide nanoparticles having a substituent group R, $R^a$ or $R^b$ introduced in their surface via a silicon atom, which are also useful. The resulting metal oxide nanoparticles are fully compatible with the polysilazane as component (a).

When the untreated metal oxide nanoparticles are surface treated with the polysilazane as component (a), the amount of the polysilazane used is determined by computing the minimum coverage area of polysilazane (minimum area covered with 1 g of repeating unit of polysilazane) according to the following formula (I), computing the minimum addition amount of polysilazane according to the following formula (II), and using the minimum addition amount as a guideline.

$$\text{Minimum coverage area (m}^2\text{/g) of polysilazane} = \frac{[13 \times 10^{-20}(\text{m}^2)] \times [6.02 \times 10^{23}]}{\text{formula weight (g) of repeating unit of polysilazane}} \quad (I)$$

$$\text{Minimum addition amount (g) of polysilazane} = \frac{\text{addition amount (g) of metal oxide nanoparticles} \times \text{specific surface area (m}^2\text{/g) of metal oxide nanoparticles}}{\text{minimum coverage area (m}^2\text{/g) of polysilazane}} \quad (II)$$

Particularly when the substituent group on the polysilazane is bulky, surface treatment may be complete even in an addition amount which is smaller than the minimum addition amount computed. It is preferable from the standpoint of obtaining good water repellency and water droplet sliding properties that when metal oxide nanoparticles are surface treated with the polysilazane, the amount of the polysilazane blended is equal to or more than the minimum addition amount, more preferably at least 1.3 times, even more preferably at least 2 times the minimum addition amount.

The method for surface treatment of metal oxide nanoparticles with polysilazane is not particularly limited. Although surface treatment may be performed by a well-known method of mixing metal oxide nanoparticles with polysilazane, preferably surface treatment is performed, during preparation of the inventive composition, by a method of dispersing metal oxide nanoparticles in the solvent (c), adding polysilazane to the dispersion, and mixing.

The amount of component (b) blended is typically varied depending on the type of polysilazane as component (a), and is preferably 0.001 to 30% by weight, more preferably 0.01 to 10% by weight, even more preferably 0.01 to 5% by weight based on the overall composition. If the amount of component (b) exceeds 30% by weight, the composition may have too high a viscosity and become non-uniform. If the amount of component (b) is less than 0.001% by weight, a film may become too thin to exhibit water repellency.

(c) Aprotic Solvent

As will be described later, the inventive composition may be coated on a substrate by any desired coating methods to form a film thereon. A solvent is added to the composition in order to adjust the viscosity of the composition appropriate for a particular coating method.

The solvent used herein is not particularly limited as long as it is aprotic and inert to the polysilazane having formula (1). Suitable solvents include hydrocarbon solvents such as hexane, heptane, octane, isooctane, nonane, decane, toluene, xylene and mesitylene; hydrocarbon solvent mixtures such as isoparaffin base solvents and naphthene base solvents; ketones such as acetone, methyl ethyl ketone, methyl isobutyl ketone; nitriles such as acetonitrile, propionitrile, benzonitrile; amides such as dimethylformamide, dimethylacetamide, N-methylpyrrolidone; ether solvents such as diethyl ether, dipropyl ether, diisopropyl ether, tetrahydrofuran, cyclopentyl methyl ether, dibutyl ether, ethylene glycol dimethyl ether, propylene glycol dimethyl ether, diethylene glycol dimethyl ether, dipropylene glycol dimethyl ether; and ester solvents such as ethyl acetate, propyl acetate, isopropyl acetate, butyl acetate, methoxyethyl acetate, and hexyl acetate, which may be used alone or in admixture.

The amount of component (c) blended is typically varied depending on the viscosity of polysilazane as component (a), a particular coating method and a necessary film thickness, and is preferably 10 to 99.9% by weight, more preferably 30 to 99.5% by weight, even more preferably 50 to 99.5% by weight based on the overall composition. If the amount of component (c) is less than 10% by weight, the composition may have a high viscosity and less solubility or dispersibility of components (a) and (b). If the amount of component (c) exceeds 99.9% by weight, a film may be too thin to exhibit water repellency.

Other Components

In the inventive composition, other components may be added as long as their amounts are small enough to avoid any detrimental effects to the invention. Suitable components include such additives as pigments, dyes, dispersants, viscosity regulators, leveling agents as well as metal oxide nanoparticles having no organic groups on their surface other than component (b).

Water Repellent Film-Forming Composition

The water repellent film-forming composition of the invention may be prepared by mixing components (a), (b) and (c) and optionally other components, and dissolving or dispersing components (a), (b) and (c) in a solvent. Mixing means is arbitrary. Any of mixing machines such as agitators and mixers may be used, for example. Ultrasonication is also acceptable.

When untreated metal oxide nanoparticles or metal oxide nanoparticles having a monovalent hydrocarbon, alkylsilyl or alkoxysilyl group on their surface which have been surface treated with the polysilazane as component (a) are used, one procedure may involve the steps of previous surface treatment and mixing the remainder of component (a), the surface treated nanoparticles, and component (c) together. Another procedure involves the steps of mixing a sufficient amount of component (a) with untreated metal oxide nanoparticles or metal oxide nanoparticles having a monovalent hydrocarbon, alkylsilyl or alkoxysilyl group on their surface and component (c), mixing and dispersing the contents while effecting surface treatment for thereby obtaining the inventive composition.

The composition thus obtained is a uniform solution or dispersion which is free of precipitate or gel and is chemically stable. This prevents the composition from becoming a heterogeneous mixture as a result of insolubles forming in an irreversible manner, unless protonic compounds (such as water or methanol) capable of decomposing polysilazane are accidentally introduced. Therefore, the composition remains effective for use over a long time while keeping its performance unchanged. The polysilazane also functions as a hygroscopic agent, which prevents the composition from degradation even when a minute amount of water is accidentally mixed therein.

Substrate

Since the polysilazane as component (a) is highly adhesive to a substrate surface, the inventive composition is applicable to a variety of substrates. By coating the composition to a substrate of any material, for example, metals, resins, glass, ceramics or composite materials thereof, a water repellent film is formed on the substrate.

Coating Method

The method for coating the inventive composition is such that the substrate surface is uniformly wetted with the composition. Suitable methods include, for example, flow coating, dip coating, curtain coating, spin coating, spray coating, and bar coating. An appropriate method may be selected depending on the type and shape of the substrate and the necessary film thickness.

Water Repellent Film

A water repellent film may be formed in a simple manner by coating the inventive composition to a substrate surface and removing the aprotic solvent as component (c). Common means for removing the solvent is volatilization under atmospheric or reduced pressure. The removal time may be shortened by heating.

It is possible to convert a portion or all of the polysilazane to polysiloxane by applying water to the surface of the coated composition (or film) when or after the aprotic solvent is removed. This treatment is preferable in that the film is further improved in durability. The means for applying water may be arbitrary, such as placement in a moist environment at RH 10 to 95%, or immersion in water.

The water repellent film may have any desired thickness. Most often, the average thickness is preferably 10 nm to 50 µm, more preferably 50 nm to 10 µm. If the thickness is less than 10 nm, the film is too thin to exhibit water repellency. If the thickness exceeds 50 µm, the film may crack upon solvent removal.

The water repellent film fulfills both water repellency and sliding of water droplets. The contact angle with water of a film as an index of water repellency is typically at least 150°, indicative of superhydrophobic property, preferably at least 160°. The sliding angle of water on a film (i.e., the angle at which a water droplet starts sliding down) as an index of water droplet sliding, which varies with the size of a droplet, is typically up to 5°, preferably up to 3°, more preferably up to 1°. Also a film having a contact angle of at least 160° is preferred because the sliding speed of water thereon is high.

EXAMPLE

Examples of the invention are given below by way of illustration and not by way of limitation.

Synthesis Example 1

Synthesis of octylpolysilazane

A 1-L four-neck glass flask equipped with a stirrer, gas feed tube, thermometer and reflux condenser was internally purged with nitrogen. While nitrogen gas was passed to the open top of the reflux condenser to prevent entry of ambient air, the flask was charged with 309.6 g (1.25 mol) of octyltrichlorosilane and 500 mL of toluene, which was stirred until uniform. While the solution was stirred at room temperature, ammonia gas was fed into the solution through the feed tube at a rate of ~0.62 mol/hr. The ammonia feed was continued for 7.1 hours while the flask was cooled such that the solution temperature might not exceed 40° C. Thereafter, the ammonia feed was stopped, nitrogen gas was blown through the feed tube at a rate of 0.5 L/min for 6 hours to purge the excessive ammonia gas. The resulting white solid was removed by a membrane filter, obtaining a colorless clear solution. The solution was concentrated under reduced pressure and vacuum dried at room temperature, yielding 142.8 g of white turbid oily octylpolysilazane.

The octylpolysilazane had a weight average molecular weight (Mw) of 2,420 and a number average molecular weight (Mn) of 1,900, as measured by gel permeation chromatography (GPC) versus polystyrene standards.

The GPC analysis was performed under the following conditions (the same, hereinafter).
Analyzer: Prominence GPC system (Shimadzu Corp.)
Column: Shodex LF-404 (4.6 mm×250 mm)×2
Eluent: tetrahydrofuran (THF)
Flow rate: 0.35 mL/min
Detector: RI
Column oven temperature: 40° C.
Standards: polystyrene On infrared absorption spectroscopy (FT-IR) analysis, absorption peaks were observed at 893 $cm^{-1}$ (Si—N—Si), 1152 $cm^{-1}$ (N—H), 2853 $cm^{-1}$, 2920 $cm^{-1}$ (C—H), and 3384 $cm^{-1}$ (N—H), demonstrating the formation of the desired octylpolysilazane.

Synthesis Example 2

Synthesis of decylpolysilazane

The procedure of Synthesis Example 1 was repeated except that 344.6 g (1.25 mol) of decyltrichlorosilane was used instead of octyltrichlorosilane, yielding decylpolysilazane as a white oily product. It had a Mw of 2,970 and a Mn of 2,230.

Synthesis Example 3

Synthesis of hexylpolysilazane

The procedure of Synthesis Example 1 was repeated except that 272.5 g (1.25 mol) of hexyltrichlorosilane was used instead of octyltrichlorosilane and 750 mL of toluene was used, yielding hexylpolysilazane as a white oily product. It had a Mw of 1,250 and a Mn of 1,130.

Synthesis Example 4

Synthesis of propylpolysilazane

The procedure of Synthesis Example 1 was repeated except that 221.9 g (1.25 mol) of propyltrichlorosilane was used instead of octyltrichlorosilane and 1,125 mL of cyclopentyl methyl ether was used instead of toluene, yielding propylpolysilazane as a white oily product. It had a Mw of 890 and a Mn of 770.

Synthesis Example 5

Synthesis of (tridecafluorooctyl)(trifluoropropyl)polysilazane

A 300-mL four-neck glass flask equipped with a stirrer, gas feed tube, thermometer and reflux condenser was internally purged with nitrogen. While nitrogen gas was passed to the open top of the reflux condenser to prevent entry of ambient air, the flask was charged with 54.2 g (112.5 mmol) of 3,3,4,4,5,5,6,6,7,7,8,8,8-tridecafluorooctyltrichlorosilane, 8.68 g (37.5 mmol) of 3,3,3-trifluoropropyltrichlorosilane, and 135 mL of cyclopentyl methyl ether, which was stirred until uniform. While the solution was stirred at room temperature, ammonia gas was fed into the solution through the feed tube at a rate of ~124 mmol/hr. The ammonia feed was continued for 4.8 hours while the flask was cooled such that the solution temperature might not exceed 40° C. Thereafter, the ammonia feed was stopped, nitrogen gas was blown through the feed tube at a rate of 0.15 L/min for 6 hours to purge the excessive ammonia gas. The resulting white solid was removed by a membrane filter, obtaining a colorless clear solution. The solution was concentrated under reduced pressure and vacuum dried at room temperature, yielding 39.3 g of a white turbid oily product.

The product had a Mw of 2,750 and a Mn of 2,500. On FT-IR analysis, absorption peaks were observed at 898 $cm^{-1}$ (Si—N—Si), 1141 $cm^{-1}$ (C—F), 1183 $cm^{-1}$ (N—H), 2946 $cm^{-1}$ (C—H), and 3394 $cm^{-1}$ (N—H), demonstrating the formation of the desired (tridecafluorooctyl)(trifluoropropyl)polysilazane.

Synthesis Example 6

Synthesis of tridecafluorooctylpolysilazane

A 200-mL four-neck glass flask equipped with a stirrer, gas feed tube, thermometer and reflux condenser was internally purged with nitrogen. While nitrogen gas was passed to the open top of the reflux condenser to prevent entry of ambient air, the flask was charged with 48.2 g (100 mmol) of 3,3,4,4,5,5,6,6,7,7,8,8,8-tridecafluorooctyltrichlorosilane and 90 mL of m-xylene hexafluoride, which was stirred until uniform. While the solution was stirred at room temperature, ammonia gas was fed into the solution through the feed tube at a rate of ~79 mmol/hr. The ammonia feed was continued for 5.5 hours while the flask was cooled such that the solution temperature might not exceed 40° C. Thereafter, the ammonia feed was stopped, nitrogen gas was blown through the feed tube at a rate of 0.15 L/min for 2 hours to purge the excessive ammonia gas. The resulting white solid was removed by a membrane filter, obtaining a colorless clear solution. The solution was concentrated under reduced pressure and vacuum dried at room temperature, yielding 25.4 g of a white turbid oily product.

The product had a Mw of 2,840 and a Mn of 2,680. On FT-IR analysis, absorption peaks were observed at 932 cm$^{-1}$ (Si—N—Si), 1141 cm$^{-1}$ (C—F), 1182 cm$^{-1}$ (N—H), 2945 cm$^{-1}$ (C—H), and 3394 cm$^{-1}$ (N—H), demonstrating the formation of the desired tridecafluorooctylpolysilazane.

Synthesis Example 7

Synthesis of hexyl(dimethyl)polysilazane

A 500-mL four-neck glass flask equipped with a stirrer, gas feed tube, thermometer and reflux condenser was internally purged with nitrogen. While nitrogen gas was passed to the open top of the reflux condenser to prevent entry of ambient air, the flask was charged with 32.9 g (150 mmol) of hexyltrichlorosilane, 6.5 g (50 mmol) of dimethyldichlorosilane, and 165 mL of toluene, which was stirred until uniform. While the solution was stirred at room temperature, ammonia gas was fed into the solution through the feed tube at a rate of ~150 mmol/hr. The ammonia feed was continued for 6 hours while the flask was cooled such that the solution temperature might not exceed 40° C. Thereafter, the ammonia feed was stopped, nitrogen gas was blown through the feed tube at a rate of 0.15 L/min for 2 hours to purge the excessive ammonia gas. The resulting white solid was removed by a membrane filter, obtaining a colorless clear solution. The solution was concentrated under reduced pressure and vacuum dried at room temperature, yielding 18.9 g of a colorless oily product.

The product had a Mw of 1,574 and a Mn of 1,144. On FT-IR analysis, absorption peaks were observed at 900 cm$^{-1}$, 1153 cm$^{-1}$ (Si—N—Si), 1459 cm$^{-1}$, 2853 cm$^{-1}$ (C—H), and 3389 cm$^{-1}$ (N—H), demonstrating the formation of the desired polysilazane.

Synthesis Example 8

Preparation of Dispersion of Silica Particles Having Trimethoxy Group on Surface In a glass container with a resin cap, 5.00 g of fumed silica (specific surface area 205 m$^2$/g, trade name Rheolosil QS-102, Tosoh Corp.) was weighed, and 56.25 g of cyclopentyl methyl ether and 1.25 g of 1-trimethoxysilyloxy-1-ethoxypropene were added. While the container was shaken at intervals, the mixture was ultrasonicated for 1 hour to disperse fumed silica uniformly. A white translucent stable dispersion was obtained. GC analysis of the dispersion showed that 1-trimethoxysilyloxy-1-ethoxypropene disappeared and a volatile compound having a trimethoxysilyl group was not formed. It was judged that the trimethoxysilyl group was introduced to the silica surface.

Example 1

In a glass container with a resin cap, 2 g of fumed silica (specific surface area 205 m$^2$/g, trade name Rheolosil QS-102, Tosoh Corp.) was weighed, and 77 g of cyclopentyl methyl ether and 20 g of dipropylene glycol dimethyl ether were added. The mixture was ultrasonicated for 30 minutes to disperse fumed silica. To the dispersion, 1 g of the octylpolysilazane obtained in Synthesis Example 1 was added, followed by ultrasonication for a further 15 minutes. A white translucent, water repellent film-forming composition was obtained. In the sealed state, the composition remained stable at room temperature over 1 month.

Using a bar coater, the composition as a coating liquid was coated on a soda glass substrate (Matsunami Glass Ind., Ltd.) in such a coating weight that the film might have a thickness of ~1 μm after drying. The coating was kept in an environment at 25° C. and RH 50%, allowing the solvent to volatilize off and forming a water repellent film on the glass substrate.

Evaluation of Water Repellent Film

Using a contact angle meter DMs-401 (Kyowa Interface Science Co., Ltd.), the water repellent film was measured for a contact angle with pure water (10 μL) and a sliding angle of pure water (20 μL) on a film surface at 25° C. and RH 50%. The contact angle was 163° and the sliding angle was 1°. It was demonstrated that the film was superhydrophobic and significantly improved in sliding property of water droplets.

Next, the glass substrate bearing the water repellent film was immersed in pure water at 25° C. for 1 hour, after which contact angle and sliding angle were measured again. The contact angle was 163° and the sliding angle was 1°.

Using a dishwasher NP-TCM4 (Panasonic Corp.), the coated glass substrate was washed with hot water for 1 hour, after which contact angle and sliding angle were measured. The contact angle was 163° and the sliding angle was 1°. No loss of performance by water washing was found, attesting that the water repellent film was durable.

For this composition, the blending amount, stability, film thickness, contact angle, and sliding angle are tabulated in Table 1.

Example 2

A water repellent film-forming composition was prepared as in Example 1 except that the coating weight by means of the bar coater was changed so as to give a dry film thickness as shown in Table 1.

Using the composition, a water repellent film was formed on a glass substrate as in Example 1. The film was superhydrophobic and significantly improved in sliding property of water droplets.

For this composition, the blending amount, stability, film thickness, contact angle, and sliding angle are tabulated in Table 1.

Example 3

A water repellent film-forming composition was prepared as in Example 1 except that the amounts of fumed silica and octylpolysilazane added were changed each to 1.5 g.

Using the composition, a water repellent film was formed on a glass substrate as in Example 1. The film was superhydrophobic and significantly improved in sliding property of water droplets.

For this composition, the blending amount, stability, film thickness, contact angle, and sliding angle are tabulated in Table 1.

Comparative Example 1

A water repellent film-forming composition was prepared as in Example 1 except that the amounts of fumed silica and octylpolysilazane added were changed as in Table 1.

Using the composition, a water repellent film was formed on a glass substrate as in Example 1. For this composition, the blending amount, stability, film thickness, contact angle, and sliding angle are tabulated in Table 1.

The film of Comparative Example 1 wherein fumed silica was omitted was not superhydrophobic.

TABLE 1

| Formulation | Example | | | Comparative Example |
| --- | --- | --- | --- | --- |
|  | 1 | 2 | 3 | 1 |
| Polysilazane (R = octyl), g | 1 | 1 | 1.5 | 3 |
| Fumed silica, g | 2 | 2 | 1.5 | 0 |
| Cyclopentyl methyl ether, g | 77 | 77 | 77 | 77 |
| Dipropylene glycol dimethyl ether, g | 20 | 20 | 20 | 20 |
| Minimum coverage area of polysilazane (theory, $m^2/g$) | 478 | 478 | 478 | 478 |
| Minimum addition amount of polysilazane relative to fumed silica (theory, g) | 0.86 | 0.86 | 0.64 | — |
| Composition stability | good | good | good | good |
| Dry film thickness (μm) | 1 | 0.1 | 1 | 1 |
| Water contact angle (°) | 163 | 161 | 164 | 109 |
| Water sliding angle (°) | 1 | 1 | 1 | 27 |

Examples 4 to 6

Water repellent film-forming compositions were prepared as in Example 1 except that the type of polysilazane added was changed as shown in Table 2.

Using the compositions, water repellent films were formed on a glass substrate as in Example 1. The films were superhydrophobic and significantly improved in sliding property of water droplets.

For these compositions, the blending amount, stability, film thickness, contact angle, and sliding angle are tabulated in Table 2.

TABLE 2

| Formulation | Example | | |
| --- | --- | --- | --- |
|  | 4 | 5 | 6 |
| Polysilazane (R = decyl), g | 1 | — | — |
| Polysilazane (R = hexyl), g | — | 1 | — |
| Polysilazane (R = propyl), g | — | — | 1 |
| Fumed silica, g | 2 | 2 | 2 |
| Cyclopentyl methyl ether, g | 77 | 77 | 77 |
| Dipropylene glycol dimethyl ether, g | 20 | 20 | 20 |
| Minimum coverage area of polysilazane (theory, $m^2/g$) | 408 | 576 | 835 |
| Minimum addition amount of polysilazane relative to fumed silica (theory, g) | 1.01 | 0.71 | 0.49 |
| Composition stability | good | good | good |
| Dry film thickness (μm) | 1 | 1 | 1 |
| Water contact angle (°) | 162 | 164 | 164 |
| Water sliding angle (°) | 1 | 1 | 3 |

Example 7

In a glass container with a resin cap, 0.9 g of hydrophobic fumed silica surface-modified with trimethylsilyl group (specific surface area 145 $m^2/g$, trade name Aerosil RX200, Nippon Aerosil Co., Ltd.) was weighed, and 30.8 g of cyclopentyl methyl ether and 8.0 g of dipropylene glycol dimethyl ether were added. The mixture was mixed on a planetary mixer for 1 minute to disperse the surface-modified fumed silica. The octylpolysilazane obtained in Synthesis Example 1, 0.3 g, was added to the dispersion, which was mixed on a planetary mixer for a further 5 minutes. A white translucent, water repellent film-forming composition was obtained. In the sealed state, the composition remained stable at room temperature over 1 month.

Using a bar coater, the composition as a coating liquid was coated on a soda glass substrate (Matsunami Glass Ind., Ltd.) in such a coating weight that the film might have a thickness of ~1 μm after drying. The coating was kept in an environment at 25° C. and RH 50%, allowing the solvent to volatilize off and forming a water repellent film on the glass substrate.

Evaluation of Water Repellent Film

Using a contact angle meter DMs-401 (Kyowa Interface Science Co., Ltd.), the water repellent film was measured for a contact angle with pure water (10 μL) and a sliding angle of pure water (20 μL) on a film surface at 25° C. and RH 50%. The contact angle was 163° and the sliding angle was 1°. It was demonstrated that the film was superhydrophobic and significantly improved in sliding property of water droplets.

Example 8

A water repellent film-forming composition was prepared as in Example 7 except that the polysilazane added was changed to the (tridecafluorooctyl)(trifluoropropyl)polysilazane obtained in Synthesis Example 5.

Using the composition, a water repellent film was formed on a glass substrate as in Example 7. The film was superhydrophobic and significantly improved in sliding property of water droplets.

Example 9

A water repellent film-forming composition was prepared as in Example 7 except that the polysilazane added was changed to the tridecafluorooctylpolysilazane obtained in Synthesis Example 6 and 38.8 g of m-xylene hexafluoride was used as the solvent.

Using the composition, a water repellent film was formed on a glass substrate as in Example 7. The film was superhydrophobic and significantly improved in sliding property of water droplets.

For these compositions, the blending amount, stability, film thickness, contact angle, and sliding angle are tabulated in Table 3.

TABLE 3

| Formulation | Example | | |
| --- | --- | --- | --- |
|  | 7 | 8 | 9 |
| Polysilazane (R = octyl), g | 0.3 | — | — |
| Polysilazane (R = tridecafluorooctyltrifluoropropyl), g | — | 0.3 | — |
| Polysilazane (R = tridecafluorooctyl), g | — | — | 0.3 |
| Surface-trimethylsilylated fumed silica, g | 0.9 | 0.9 | 0.9 |
| Cyclopentyl methyl ether, g | 30.8 | 30.8 | — |
| Dipropylene glycol dimethyl ether, g | 8.0 | 8.0 | — |
| Composition stability | good | good | good |
| Dry film thickness (μm) | 1 | 1 | 1 |
| Water contact angle (°) | 163 | 165 | 164 |
| Water sliding angle (°) | 1 | 1 | 1 |

Example 10

In a glass container with a resin cap, 0.18 g of fumed silica (specific surface area 205 $m^2/g$, trade name Rheolosil QS-102, Tosoh Corp.) was weighed, and 6.10 g of cyclopentyl methyl ether, 1.60 g of dipropylene glycol dimethyl ether, and 0.036 g of 1-trimethoxysilyloxy-1-ethoxypropene were added. The mixture was ultrasonicated for 30 minutes to introduce a trimethoxysilyl group into the silica surface and to disperse fumed silica in the solvent uniformly. To the dispersion, a 50 wt % cyclopentyl methyl ether solution containing 0.06 g of the octylpolysilazane obtained in Synthesis Example 1 was added, followed by ultrasonication for a further 15 minutes. A white translucent, water repellent film-forming composition was obtained. In the sealed state, the composition remained stable at room temperature over 1 month. The method for preparing the composition of this Example is designated Method A.

Using a bar coater, the composition as a coating liquid was coated on a soda glass substrate (Matsunami Glass Ind., Ltd.) in such a coating weight that the film might have a thickness of ~1 μm after drying. The coating was kept in an environment at 25° C. and RH 50%, allowing the solvent to volatilize off and forming a water repellent film on the glass substrate.

Evaluation of Water Repellent Film

Using a contact angle meter DMs-401 (Kyowa Interface Science Co., Ltd.), the water repellent film was measured for a contact angle with pure water (10 μL) and a sliding angle of pure water (20 μL) on a film surface at 25° C. and RH 50%. The contact angle was 161° and the sliding angle was 1°. It was demonstrated that the film was superhydrophobic and significantly improved in sliding property of water droplets.

Using a dishwasher NP-TCM4 (Panasonic Corp.), the coated glass substrate was washed with hot water for 1 hour, after which contact angle and sliding angle were measured. The contact angle was 162° and the sliding angle was 1°. No loss of performance by water washing was found, attesting that the water repellent film was durable.

Also, the glass substrate bearing the water repellent film was measured for overall light transmittance and haze using a haze meter HZ-V3 (Suga Test Instruments Co., Ltd.). It showed an overall light transmittance of 92.7% and a haze of 0.8%, indicating that the film was fully transparent.

For this composition, the blending amount, contact angle, sliding angle, overall light transmittance, and haze are tabulated in Table 4.

Examples 11 to 13

Water repellent film-forming compositions were prepared by Method A as in Example 10 except that the amounts of components added were changed as shown in Table 4.

Using the compositions, water repellent films were formed on a glass substrate as in Example 10. The films were superhydrophobic and significantly improved in sliding property of water droplets.

For these compositions, the blending amount, contact angle, sliding angle, overall light transmittance, and haze are tabulated in Table 4.

Comparative Example 2

A water repellent film-forming composition was prepared as above except that fumed silica and 1-trimethoxysilyloxy-1-ethoxypropene were omitted, that is, according to the formulation shown in Table 4.

Using the composition, a water repellent film was formed on a glass substrate as in Example 10. For this composition, the blending amount, contact angle, and sliding angle are tabulated in Table 4.

The film of Comparative Example 2 wherein fumed silica was omitted was water repellent, but not superhydrophobic.

TABLE 4

| Formulation | Example | | | | Comparative Example |
| --- | --- | --- | --- | --- | --- |
| | 10 | 11 | 12 | 13 | 2 |
| Polysilazane of SE1 (R = octyl), g | 0.060 | 0.060 | 0.060 | 0.12 | 0.30 |
| Fumed silica, g | 0.18 | 0.18 | 0.12 | 0.12 | 0 |
| 1-Trimethoxysilyloxy-1-ethoxypropene, g | 0.036 | 0.072 | 0.024 | 0.036 | — |
| Cyclopentyl methyl ether *[1], g | 6.16 | 6.16 | 4.62 | 6.16 | 7.70 |
| Dipropylene glycol dimethyl ether, g | 1.60 | 1.60 | 1.20 | 1.60 | 2.00 |
| Preparation Method | A | A | A | A | — |
| Water contact angle (°) | 161 | 164 | 164 | 163 | 109 |
| Water sliding angle (°) | 1 | 1 | 1 | 1 | 27 |
| Overall light transmittance (%) | 92.7 | 92.8 | 92.8 | 93.0 | — |
| Haze (%) | 0.8 | 0.7 | 1.5 | 2.3 | — |

*[1] total amount of cyclopentyl methyl ether in composition

Example 14

In a glass container with a resin cap, 1.50 g of the dispersion of silica particles having trimethoxysilyl group obtained in Synthesis Example 8 was weighed, and 4.62 g of cyclopentyl methyl ether, 1.02 g of dipropylene glycol dimethyl ether, and a 25 wt % dipropylene glycol dimethyl ether solution containing 0.06 g of the octylpolysilazane in Synthesis Example 1 were added. The contents were mixed for 1 minute, yielding a white translucent, water repellent film-forming composition. In the sealed state, the composition remained stable at room temperature over 1 month. The method for preparing the composition of this Example is designated Method B.

As in Example 10, the composition was coated on a glass substrate to form a water repellent film thereon. The film was superhydrophobic and significantly improved in sliding property of water droplets.

For this composition, the blending amount, contact angle, sliding angle, overall light transmittance, and haze are tabulated in Table 5.

Example 15

A water repellent film-forming composition was prepared by Method B as in Example 14 except that the amounts of components added were changed as shown in Table 5.

As in Example 14, the composition was coated on a glass substrate to form a water repellent film thereon. The film was superhydrophobic and significantly improved in sliding property of water droplets.

For this composition, the blending amount, contact angle, sliding angle, overall light transmittance, and haze are tabulated in Table 5.

TABLE 5

| Formulation | Example 14 | Example 15 |
|---|---|---|
| Polysilazane of SE1, g | 0.060 | 0.060 |
| Fumed silica *2, g | 0.12 | 0.18 |
| 1-Trimethoxysilyloxy-1-ethoxypropene *2, g | 0.030 | 0.045 |
| Cyclopentyl methyl ether, g | 4.62 | 6.16 |
| Dipropylene glycol dimethyl ether *3, g | 1.20 | 1.60 |
| Preparation Method | B | B |
| Water contact angle (°) | 160 | 162 |
| Water sliding angle (°) | 1 | 4 |
| Overall light transmittance (%) | 92.4 | 92.9 |
| Haze (%) | 1.0 | 0.4 |

*2 amounts of fumed silica and 1-trimethoxysilyloxy-1-ethoxypropene used in Synthesis Example 8
*3 total amount of dipropylene glycol dimethyl ether in composition

Examples 16 to 18

Water repellent film-forming compositions were prepared by Method A or B as in Example 10 or 14 except that the type of polysilazane and the amounts of components added were changed as shown in Table 6.

As in Example 1, each composition was coated on a glass substrate to form a water repellent film thereon. The film was superhydrophobic and significantly improved in sliding property of water droplets.

For these compositions, the blending amount, contact angle, sliding angle, overall light transmittance, and haze are tabulated in Table 6.

TABLE 6

| Formulation | Example 16 | Example 17 | Example 18 |
|---|---|---|---|
| Polysilazane of SE3 (R = hexyl), g | 0.060 | — | — |
| Polysilazane of SE7 (R = hexyl, $R^a$ = methyl), g | — | 0.060 | — |
| Polysilazane of SE2 (R = decyl), g | — | — | 0.060 |
| Fumed silica, g | 0.18 | 0.12 | 0.18 |
| 1-Trimethoxysilyloxy-1-ethoxypropene, g | 0.018 | 0.030 | 0.072 |
| Cyclopentyl methyl ether *1, g | 6.16 | 4.62 | 6.16 |
| Dipropylene glycol dimethyl ether *3, g | 1.60 | 1.20 | 1.60 |
| Preparation Method | A | B | A |
| Water contact angle (°) | 162 | 163 | 160 |
| Water sliding angle (°) | 2 | 5 | 2 |
| Overall light transmittance (%) | 92.3 | 93.3 | 92.7 |
| Haze (%) | 1.1 | 0.82 | 1.1 |

*1 total amount of cyclopentyl methyl ether in composition
*3 total amount of dipropylene glycol dimethyl ether in composition Japanese Patent Application Nos. 2018-075839 and 2018-246867 are incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A water repellent film-forming composition comprising:
   (a) a polysilazane having an optionally fluorinated $C_3$-$C_{20}$ monovalent hydrocarbon group bonded to a silicon atom,
   (b) untreated metal oxide nanoparticles, metal oxide nanoparticles having an optionally fluorinated $C_1$-$C_{20}$ monovalent hydrocarbon group on their surface, or metal oxide nanoparticles having an alkylsilyl or alkoxysilyl group on their surface, and
   (c) an aprotic solvent,
   wherein component (a) is a polysilazane having the general formula (1):

$$[RSi(NH)_{1.5}]_m[R^a{}_2Si(NH)_{1.0}]_n[R^b{}_3Si(NH)_{0.5}]_p \qquad (1)$$

wherein R is each independently an optionally fluorinated $C_3$-$C_{20}$ monovalent hydrocarbon group, $R^a$ and $R^b$ are each independently an optionally fluorinated $C_1$-$C_{20}$ monovalent hydrocarbon group, m is an integer of 1 to 100, n and p are each independently an integer of 0 to 100, and the sum of m, n and p is an integer of 4 to 300.

2. The composition of claim 1 wherein the metal oxide nanoparticles (b) have been surface treated with the polysilazane having formula (1) so that the nanoparticles have an optionally fluorinated $C_3$-$C_{20}$ monovalent hydrocarbon group via a silicon atom on their surface.

3. The composition of claim 1 wherein the metal oxide nanoparticles (b) are of silica.

4. A water repellent film comprising:
   (a) a polysilazane having an optionally fluorinated $C_3$-$C_{20}$ monovalent hydrocarbon group bonded to a silicon atom, and
   (b) untreated metal oxide nanoparticles, metal oxide nanoparticles having an optionally fluorinated $C_1$-$C_{20}$ monovalent hydrocarbon group on their surface, or metal oxide nanoparticles having an alkylsilyl or alkoxysilyl group on their surface,
   wherein component (a) is a polysilazane having the general formula (1):

$$[RSi(NH)_{1.5}]_m[R^a{}_2Si(NH)_{1.0}]_n[R^b{}_3Si(NH)_{0.5}]_p \qquad (1)$$

wherein R is each independently an optionally fluorinated $C_3$-$C_{20}$ monovalent hydrocarbon group, $R^a$ and $R^b$ are each independently an optionally fluorinated $C_1$-$C_{20}$ monovalent hydrocarbon group, m is an integer of 1 to 100, n and p are each independently an integer of 0 to 100, and the sum of m, n and p is an integer of 4 to 300.

* * * * *